Sept. 2, 1969    N. B. PROCTOR    3,465,274
SEARCH COIL ARRANGEMENT
Filed Oct. 23, 1967    2 Sheets-Sheet 1
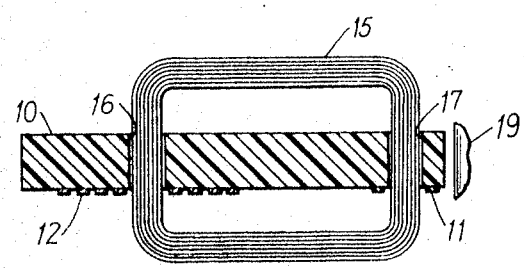
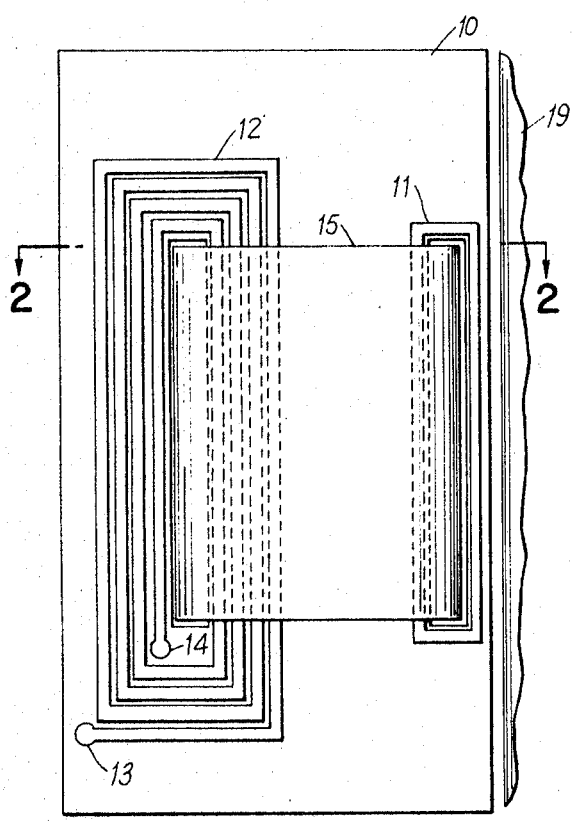
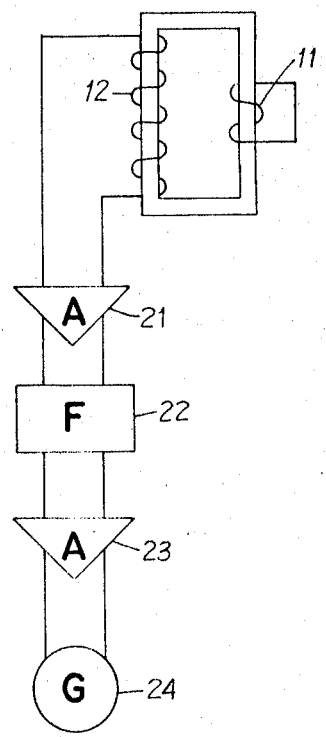
INVENTOR.
NOEL B. PROCTOR Sept. 2, 1969  N. B. PROCTOR  3,465,274
SEARCH COIL ARRANGEMENT
Filed Oct. 23, 1967  2 Sheets-Sheet 2

INVENTOR.
NOEL B. PROCTOR

United States Patent Office 3,465,274
Patented Sept. 2, 1969

3,465,274
SEARCH COIL ARRANGEMENT
Noel B. Proctor, Houston, Tex., assignor to American Machine and Foundry Company, New York, N.Y., a corporation of New Jersey
Continuation-in-part of application Ser. No. 652,463, July 26, 1967. This application Oct. 23, 1967, Ser. No. 681,052
Int. Cl. H01f 27/28
U.S. Cl. 336—73
8 Claims

ABSTRACT OF THE DISCLOSURE

A printed circuit search coil arrangement for use in magnetic testing equipment including a first coil for detecting a magnetic flux pattern and a second coil magnetically coupled with the first coil. The transformer action of the two coils allows an induced signal in the first coil to be stepped up in voltage in the second coil. The first or primary coil may include several loops connected in parallel-aiding, series-aiding, or series-opposed. Each loop may be magnetically coupled to a second coil. A current source may be serially connected with either the first or second coils to bias the magnetic coupling means thereby utilizing a linear region of the magnetic characteristic of the magnetic coupling means.

BACKGROUND OF THE INVENTION

This invention relates to magnetic testing and more particularly to flux detector coils used in magnetic testing of ferromagnetic products for material defects.

This application is a continuation-in-part of copending application Ser. No. 652,463, filed July 26, 1967, now abandoned.

It is common practice to employ non-destructive electromagnetic techniques in checking ferromagnetic products for material defects such as surface cracks, pits and the like. In accordance with these techniques, magnetic flux is established in a portion of the product, and the magnetic flux leakage pattern at the surface of the portion is detected by a small coil positioned adjacent to the surface and oriented perpendicular to the lines of flux. Defects in the product will change the flux pattern which in turn induces a voltage in the coils. The induced voltage is passed through suitable amplifier means to an indicator such as a galvanometer.

Printed circuit detector coils, such as disclosed and claimed in copending and coassigned application Ser. No. 632,003, filed Apr. 19, 1967, are especially useful in defining and detecting small defects since the coils are highly sensitive and provide good resolution. However, because of the close proximity of the sensing coil and the product surface, the number of turns in the coil is limited. Normally, no more than two turns can be effectively utilized. Thus, printed circuit coils have the inherent limitation of generating very small signals, typically in the order of one to ten microvolts, and the signals must be strengthened before they can be passed to an indicator. One method of strengthening the signals has been to couple the printed circuit coil directly to an amplifier. However, such an amplifier must be very stable and have a noise figure well below one microvolt. Another method of strengthening the signal is to use an interstage transformer between the printed circuit coil and an amplifier. These transformers are not only expensive and bulky, but also introduce noise in the signal.

SUMMARY OF THE INVENTION

In accordance with this invention, a printed circuit board is provided with a first coil for sensing the leakage flux at the surface of a product under examination, and a second coil having a relatively large number of turns and which is magnetically coupled with and spaced from the first coil. A ferromagnetic core may be used to magnetically couple the coils, in effect forming a small transformer with the first coil being the primary and second coil being the secondary. The ferromagnetic core is preferably a thin magnetic tape wound between the coils. The small signals generated by the first coil are strengthened by the transformer action in the second coil. The primary coil may comprise a single turn or a plurality of turns connected in parallel-aiding, series-aiding or series-opposed. A current source may be connected to either the primary of secondary coil to bias the core into a region of magnetic linearity. Besides eliminating the need for expensive low noise, high stability amplifiers and interstage transformer, the search coil arrangement is small in size and easily fabricated.

The invention will be more fully understood from the following description and appended claims when taken with the drawings.

BRIEF DESCRIPTION OF THE DRAWINGS

FIGURE 1 is a side view of one embodiment of the search coil arrangement in accordance with the invention, FIGURE 2 is a section view of the search coil in FIGURE 1 taken along the lines 2—2, FIGURE 3 is a block diagram of an electrical circuit including the search coil arrangement of this invention.

DESCRIPTION OF THE PREFERRED EMBODIMENTS

Figure 4:
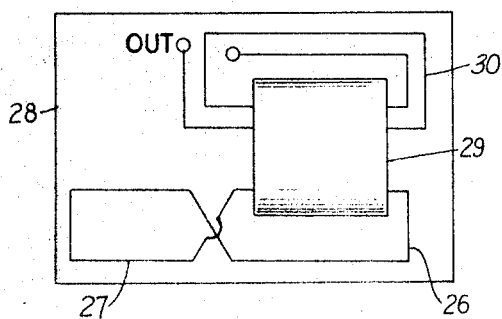
FIGURES 4–7 are other embodiments of the search coil arrangement in accordance with the invention.

Referring now to FIGURE 1, a search coil arrangement in accordance with the invention includes a substrate 10 on which are formed a first coil 11 having a single turn and a second coil 12 having a plurality of turns. Coil 11 is shorted while coil 12 is provided with terminal 13 and 14. The coils are shown in juxtaposition on one surface of the substrate, however, the coils may also be formed on opposite surfaces of the substrate. A ferromagnetic core 15 magnetically couples the coils. Preferably the magnetic core is formed by several turns of an annealed magnetic metallic tape such as Permalloy, Supermalloy, Numetal, Deltamax or other materials as disclosed in the Electrical Material Handbook published by Allegheny Ludlum Steel Corporation.

The arrangement just described is positioned with the coil 11 adjacent a surface of a member or product 19 which is under examination for defects by detecting the magnetic flux pattern adjacent the surface of the product 19.

FIGURE 2, a section view taken along the lines 2—2 in FIGURE 1, further illustrates how the ferromagnetic core 15 is wound through slots 16 and 17 in the board to magnetically couple coils 11 and 12.

Typically, each turn in the coils is about one mil (0.001 inch) wide with the spacing between turns also being about one mil. To eliminate the need for a high stability amplifier, the output voltage should be at least thirty microvolts. If the first or primary coil consists of one turn which produces one microvolt, then the second or secondary coil requires at least thirty turns. However, if the coil is working into transistor circuitry, it is desirable to have enough turns to present an output resistance of from 100 to 1000 ohms. Thus, fifty or more turns may be required, depending on the dimensions of windings.

The coils are fabricated by conventional printed circuit techniques such as photoresistant masking and etching. Machine ruling can also be used to define the coils. Further, electro deposition, spraying through a mask and other comparable methods, such as described in "Printed Circuit in Space Technology: Design and Application," Albert E. Linden, 1962, Prentice-Hall, Inc., can be used. From three to ten turns of magnetic tape twenty-five one thousandths (0.025) millimeter thick have proved satisfactory for the magnetic core. The width of the tape may be two millimeters or more depending on the width of the substrate and coils.

FIGURE 3 is a block diagram of a defect detecting electrical circuit including the search coil arrangement such as shown in FIGURE 1 of this invention which is depicted in the diagram as a core type transformer. In operation, the coil 11 is placed adjacent to a surface of a product under examination to detect the magnetic flux pattern at the surface. The voltage induced in the coil 11, typically of the order of a few microvolts, is increased in the secondary coil 12 by the transformer action. The output of coil 12 is connected to an amplifier 21, filter 22, and amplifier 23 to a galvanometer 24. Because of the increased voltage output due to the transformer action of the coil arrangement, low noise, high stability amplifiers are not required in the circuit. The band pass of the filter is designed to eliminate high frequency noise due to mill scale and low frequency signals due to undulations in the product under examination.

FIGURE 4 is another embodiment of a search coil arrangement wherein the primary coil includes two serially-opposed turns 26 and 27. The cross-over between turns may be accomplished by jumper wire as illustrated, or the two turns may be formed on opposite sides of the substrate 28 with connections made by plating through holes in the substrate. In the latter configuration, the primary windings on one side of the substrate are located outside the magnetic core while the windings on the other side couple to the core. This is used in signal processing where the enhanced signal from the core is not required and may, in fact, not be wanted because of its information content. However, both primaries are connected electrically series-opposed or aiding as may be required. Series-opposed primaries lower the noise of the system since voltages induced in the two turns due to extraneous conditions are cancelled out. In FIGURE 4, core 29 couples turn 26 to the secondary coil 30.

The primary coil can include four, six or more turns connected in series with adjacent turns being electrically opposed. Further, magnetic cores may be provided to couple each turn in the primary coil with a secondary coil. The use of multiple cores connected to a multiple turn primary and providing several secondaries is valuable for signal processing purposes. These secondary windings may be connected singly to signal conditioners or may be wired series opposed (or aiding) where defect resolution requirements dictate the need for sharp pulses. Moreover, the turns of the primary coil may be connected in series-aiding or parallel-aiding if desired.

Figure 5:
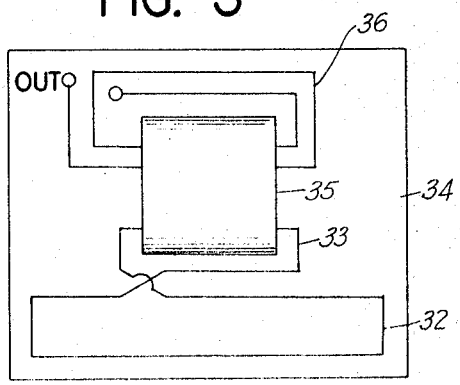

Often it is desirable to have the magnetic core spaced away from the surface of the product under examination, especially when the magnetic surface noise of the product under examination is high. The arrangement shown in FIGURE 5 is designed to accomplish this. The primary coil includes series opposed turns 32 and 33. Turn 32 is positioned near the bottom edge of substrate 34 thereby being closely adjacent to the surface of the product under examination. Turn 33 is positioned above turn 32 and is thereby spaced away from the product. Core 35 magnetically couples turn 33 to the secondary coil 36.

Figure 6:
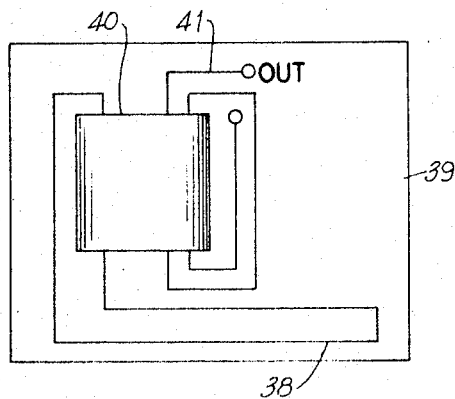

FIGURE 6 is another search coil arrangement designed to minimize the effects of surface noise. The primary winding 38 is a single turn which includes a first portion parallel to and along the bottom edge of the substrate 39 and a second portion perpendicular to the bottom edge and which is coupled by core 40 to the secondary coil 41.

When the magnetic surface noise is high, the search coil arrangements shown in FIGURE 5 and FIGURE 6 reduce the background noise and thus improve the signal to noise ratio.

Figure 8:
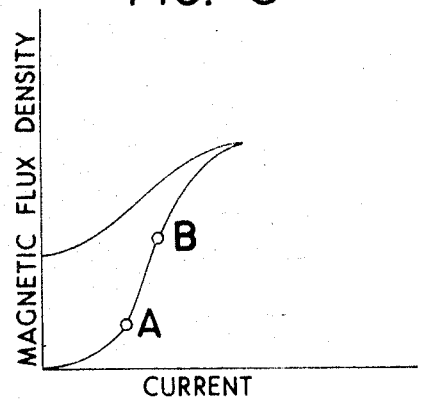
FIGURE 8 is a magnetic characteristic curve for magnetic core used with the printed circuit search coils of this invention.

The magnetic characteristics of the core used in the search coil arrangement may have several regions of linearity as shown in the magnetic characteristic curve in FIGURE 8. In order to utilize the region of linearity between points A and B on the curve, a small D.C. current can be injected into either the primary or secondary coil so that magnetic variations due to material defects in the product under examination will fall in the region of linearity.

Figure 7:
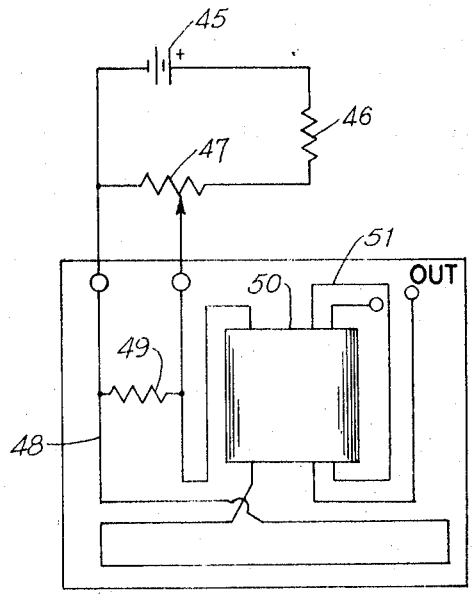

FIGURE 7 is an embodiment which includes a current source connected with the primary coil and which biases the magnetic core as above described. The source includes a battery 45 which is serially connected with a fixed resistor 46 and a potentiometer 47. The primary coil 48 is connected to the contact arm and one terminal of potentiometer 47 so that the coil shunts a portion of the potentiometer. A fixed resistor 49 is also connected in a parallel with the primary coil. A D.C. current is established in coil 48 the magnitude of which is determined by the setting of the contact arm of the potentiometer. Typically, the D.C. current is on the order of ten to one hundred microamperes depending on the characteristics of the core. Again, magnetic core 50 couples the primary coil to the secondary coil 51.

While the invention has been described with reference to preferred embodiments, this description is for illustration and is not to be construed as limiting the scope of the invention. Various modifications and changes may occur to those skilled in the art without departing from the spirit and scope of the invention as defined by the appended claims.

What is claimed is:

1. An arrangement of magnetically coupled coils for use in magnetic flux leakage testing of ferromagnetic products for detecting material defects such as cracks, pits and the like comprising:
    a nonconductive substrate having extended surface areas and an edge that is adapted to be positioned adjacent to the surface of a product to be tested,
    a closed conductive circuit formed on an extended surface of said substrate and having at least a portion thereof closely adjacent to said edge,
    a multiple-turn conductive coil with output terminals, said coil being formed on an extended surface of said substrate at a location removed from said edge,
    a transformer core magnetically coupling said closed conductive circuit and said conductive coil, said core comprising
    a magnetic tape wound upon itself in one or more loops to form a closed magnetic flux path,
    said closed magnetic flux path passing through said substrate at first and second spaced locations,
    said closed conductive circuit and said conductive coil respectively enclosing said two spaced locations,
    whereby said wound magnetic tape functions as a transformer core that couples defect signals induced in said closed conductive circuit to said conductive coil.

2. The combination claimed in claim 1 wherein said closed conductive circuit includes a first printed circuit coil that is short circuited, and
    said multiple-turn conductive coil is a second printed circuit coil,
    said coils being formed on said substrate by printed circuit techniques, or the like.

3. A flux detector coil arrangement as defined by claim 2 wherein said first and second printed circuit coils are juxtaposed on one surface of said supporting substrate.

4. A flux detector coil arrangement as defined by claim 2 wherein said first printed circuit coil is on one surface of said substrate and said second printed circuit coil is on the opposite surface of said substrate.

5. A flux detector coil arrangement as defined by claim 2 wherein said first printed circuit coil includes at least two turns connected in series-opposition.

6. A flux detector coil arrangement as defined by claim 5 wherein one turn of said first printed circuit coil is positioned closely adjacent to one edge of said supporting substrate and a second turn is positioned adjacent to said first turn but spaced from said one edge, and said transformer core magnetically couples said second turn of said first printed circuit coil and said second printed circuit coil.

7. A flux detector coil arrangement as defined by claim 2 wherein stid first printed circuit coil includes one turn with one portion of said turn being parallel to and adjacent to one edge of said substrate and a second portion which is perpendicular to said edge, and said transformer core magnetically couples said second portion of said first printed circuit coil and said second printed circuit coil.

8. A flux detector coil arrangement as defined by claim 2 and further including current source means connected with one of said printed circuit coils.

References Cited

UNITED STATES PATENTS

| 1,647,474 | 11/1927 | Seymour | 336—200 XR |
| 2,130,508 | 9/1938 | Peterson | 336—73 |
| 2,874,360 | 2/1959 | Eisler | 336—200 |
| 2,937,351 | 5/1960 | Craig | 336—200 |
| 3,080,541 | 3/1963 | Parker | 336—200 |
| 3,102,245 | 8/1963 | Lawson | 336—200 XR |
| 3,247,476 | 4/1966 | Pintell | 336—200 XR |

FOREIGN PATENTS 1,185,354  2/1959  France.

OTHER REFERENCES

Crawford et al. IBM Technical Disclosure Bulletin, vol. 8, No. 5, October 1965.

LEWIS H. MYERS, Primary Examiner

T. J. KOZMA, Assistant Examiner

U.S. Cl. X.R.

336—200, 232; 324—37